(12) United States Patent
Olovsson

(10) Patent No.: US 10,773,185 B2
(45) Date of Patent: *Sep. 15, 2020

(54) SYSTEM FOR BLENDING SOLUTIONS

(71) Applicant: GE HEALTHCARE BIO-SCIENCES AB, Uppsala (SE)

(72) Inventor: Bjorn Markus Olovsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 35 days.

This patent is subject to a terminal disclaimer.

(21) Appl. No.: 15/533,551

(22) PCT Filed: Dec. 17, 2015

(86) PCT No.: PCT/EP2015/080200
§ 371 (c)(1),
(2) Date: Jun. 6, 2017

(87) PCT Pub. No.: WO2016/097131
PCT Pub. Date: Jun. 23, 2016

(65) Prior Publication Data
US 2018/0008907 A1     Jan. 11, 2018

(30) Foreign Application Priority Data

Dec. 17, 2014   (SE) ...................................... 1451561

(51) Int. Cl.
*B01D 15/16*     (2006.01)
*G01N 30/34*     (2006.01)
(Continued)

(52) U.S. Cl.
CPC ............ *B01D 15/16* (2013.01); *B01F 3/0861* (2013.01); *B01F 15/00227* (2013.01);
(Continued)

(58) Field of Classification Search
CPC ............ B01F 15/00227; B01F 15/0022; B01F 15/00422; B01F 15/0243; G05D 11/132
See application file for complete search history.

(56) References Cited

U.S. PATENT DOCUMENTS 4,137,011 A    1/1979  Rock
4,311,586 A *  1/1982  Baldwin ................ B01D 15/08
                                                   210/101
(Continued)

FOREIGN PATENT DOCUMENTS

CN    1843553 A    10/2006
DE    9422003 U1    7/1997
(Continued)

OTHER PUBLICATIONS

Chinese Office Action dated Jun. 22, 2018 for CN Application No. 201580069103.6 (19 pages with English translation).
(Continued)

*Primary Examiner* — Ryan B Huang
(74) *Attorney, Agent, or Firm* — Eversheds Sutherland (US) LLP

(57) ABSTRACT

A system for blending solutions and a buffer solution is disclosed. In this system a switch valve is present capable of flowing one or more solutions, a low pressure pump for pumping the one or more solutions through the switch valve and a T-joint capable of receiving the one or more solutions through the low pressure pump and blending the one or more solutions with a buffer solution. A high pressure pump is present for collecting a blended solution.

16 Claims, 4 Drawing Sheets

(51) Int. Cl.
    *B01F 15/00*     (2006.01)
    *B01F 3/08*     (2006.01)
    *B01F 15/02*     (2006.01)
    *G01N 27/06*     (2006.01)
    *G01N 30/32*     (2006.01)
    *G01N 30/86*     (2006.01)

(52) U.S. Cl.
    CPC ...... *B01F 15/00422* (2013.01); *B01F 15/026* (2013.01); *G01N 27/06* (2013.01); *G01N 30/32* (2013.01); *G01N 30/34* (2013.01); *G01N 30/8658* (2013.01); *G01N 2030/347* (2013.01)

(56) References Cited

U.S. PATENT DOCUMENTS

| | | |
|---|---|---|
| 4,942,018 A | 7/1990 | Munk |
| 5,234,587 A | 8/1993 | Allington et al. |
| 9,327,212 B2 | 5/2016 | Blank et al. |
| 2007/0144973 A1 * | 6/2007 | Tsonev ................ B01D 15/168 210/659 |
| 2013/0081703 A1 | 4/2013 | Andrei et al. |
| 2014/0367319 A1 * | 12/2014 | Luongo ................ G01N 30/34 210/198.2 |

FOREIGN PATENT DOCUMENTS

| | | | |
|---|---|---|---|
| EP | 0236990 A2 | 9/1987 | |
| EP | 0236990 B1 * | 6/1993 | ............ G01N 30/34 |
| WO | 2004/103519 A2 | 12/2004 | |
| WO | 2011/066111 A1 | 6/2011 | |

OTHER PUBLICATIONS

PCT International Search Report and Written Opinion for PCT Application No. PCT/EP2015/080200 dated Mar. 22, 2016 (8 pages).

SE International-Type Search Report for SE Application No. ITS/SE14/00282 dated Jul. 16, 2015 (5 pages).

\* cited by examiner

SYSTEM FOR BLENDING SOLUTIONS

CROSS REFERENCE TO RELATED APPLICATIONS

This application claims the priority benefit of PCT/EP2015/080200 filed on Dec. 17, 2015 which claims priority benefit of Swedish Application No. 1451561-3 filed Dec. 17, 2014. The entire contents of which are hereby incorporated by reference herein.

FIELD OF THE INVENTION

The subject matter disclosed herein relates to blending of multiple solutions. More specifically the subject matter relates to a system for blending of multiple solutions for inline condition in a chromatography application.

BACKGROUND OF THE INVENTION

Chromatography is a well-established and valuable technique for separating chemical and biological substances and is widely used in research and industry, finding many applications in compound preparation, purification and analysis. There are many different forms of chromatography, liquid chromatography being of particular importance in the pharmaceutical and biological industries for the preparation, purification and analysis of proteins, peptides and nucleic acids.

A typical liquid chromatography apparatus has an upright housing in which a bed of packing material, which is usually particulate in nature and consists of a porous medium, rests against a permeable retaining layer. A liquid mobile phase enters through an inlet, for example at the top of the column, usually through a porous, perforated filter, mesh or frit, moves through the bed of packing material and is removed via an outlet, typically through a second filter, mesh or frit.

In many cases it is important to obtain liquids of precisely known composition and/or other characteristics, such as pH, ionic strength, viscosity, density etc. It is further not uncommon that the composition of the liquid should not only be at each moment precisely known and controlled, but also should vary with time in a precise and controlled manner. Such liquids are usually obtained by mixing or blending two or more liquids with each other, typically using a blending system, usually an on-site blending system, which may provide for both isocratic and gradient blending modes (step gradient and linear gradient). One application where the composition of liquids is of utmost importance is in the field of liquid chromatography, when buffers having a specified pH and optionally also ionic strength are utilized, the pH and ionic strength of the eluent being the two most important parameters that control selectivity of protein separations in chromatography, such as on ion exchange resins. Another such application is filtration.

The current systems include usage of multiple high pressure pumps to deliver different solutions/buffer solution such as acid, base and salt along with water to a mixer for forming a blended solution that needs to be delivered to the chromatography column. However characteristics of the blended solution such as pH level and conductivity cannot be determined before supplying to the chromatography column. As multiple solutions need to be supplied at varying quantity and concentration, a switch valve or a quaternary valve is used. The switch valve is capable of switching between different solutions and delivering the solutions to a blending unit. A high pressure pump is generally used to pump the solutions/buffer solution from their containers through the switch valve. The characteristics of the blended solution supplied to the chromatography column are important for performing separation of proteins in an efficient manner. Determining the characteristics of the blended solution is difficult and not accurate in current systems. The switch valve in the current systems provide inaccurate blendings and not accurate at low percentages. This is because sensors for determining these characteristics may not be able to tolerate a pressure level of the solution pumped by the high pressure pump. The sensors generally can accommodate only a pressure up to 7 bar i.e. 0.7 MPa. Thus the blended solutions may not have desired characteristics or may have variation in characteristics such as pH level and conductivity. The usage of more high pressure pumps also adds to cost of the chromatography system.

Accordingly, a need exists for an improved system for inline blending of solutions for chromatography.

SUMMARY OF THE INVENTION

The object of the invention is to provide an improved way of blending multiple solutions, which overcomes one or more drawbacks of the prior art. This is achieved by a system for inline blending of solutions for chromatography from multiple solutions and buffer solution with a simple and convenient design as defined in the independent claim.

One advantage with the disclosed system for blending of multiple solutions and a buffer solution. The system includes a switch valve capable of flowing at least one solution, a low pressure pump for pumping the one or more solutions through the switch valve and a T-joint capable of receiving the one or more solutions through the low pressure pump and blending the one or more solutions with a buffer solution. A high pressure pump is present for collecting a blended solution. As a low pressure pump is used the pressure of the buffer solution experienced at the sensors are less hence they can operate normally to determine the characteristics. Further the low pressure pump renders the system less expensive.

In an embodiment a system for blending of solutions and a buffer solution is disclosed. In this system a switch valve is present capable of flowing one or more solutions, a low pressure pump for pumping the one or more solutions through the switch valve and a T-joint capable of receiving the one or more solutions through the low pressure pump and blending the one or more solutions with a buffer solution. A high pressure pump is present for collecting a blended solution.

In another embodiment a chromatography system is disclosed. The chromatography system includes a switch valve capable of flowing at least one solution; a low pressure pump for pumping the one or more solutions through the switch valve. A T-joint is capable of receiving the one or more solutions through the low pressure pump and blending the one or more solutions with a buffer solution. A high pressure pump collects and delivers a blended solution to a chromatography column.

A more complete understanding of the present invention, as well as further features and advantages thereof, will be obtained by reference to the following detailed description and drawings.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

As discussed in detail below, embodiments of a system for blending of solutions and a buffer solution is disclosed. In this system a switch valve is present that is capable of flowing one or more solutions, a low pressure pump for pumping the one or more solutions through the switch valve and a T-joint capable of receiving the one or more solutions through the low pressure pump and blending the one or more solutions with a buffer solution. A high pressure pump is present for collecting a blended solution.

Figure 1:
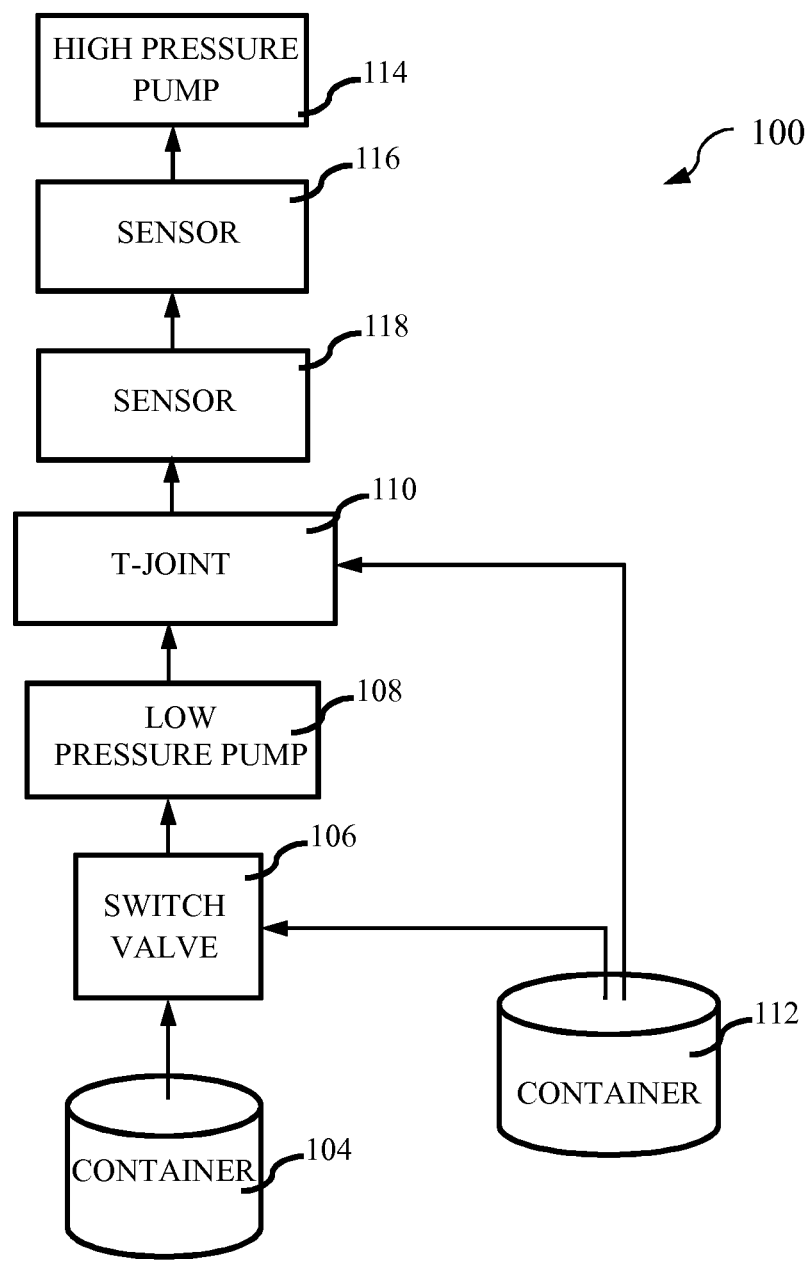
FIG. 1 is a schematic illustration of a system for preparing a buffer solution according to an embodiment.

FIG. 1 illustrates a system 100 for blending multiple solutions according to an embodiment. The system 100 includes a T-joint 102 for blending a solution with a buffer solution. The buffer solution may be for instance water. However it may be noted that different types of buffer solutions may be used. The solution may be for instance but not limited to an acid, a salt, a base and water for injection (WFI). The solution is supplied from a container 104.

The solution in the container 104 flows through a switch valve 106 due to pumping pressure developed by a low pressure pump 108 connected to the switch valve 106. In an embodiment the switch valve 106 may be a quaternary valve that can switch between multiple solutions for instance the switch valve 106 switches to allow supply of the solution and the buffer solution interchangeably based on requirement. The switch valve 106 is capable of opening and closing faster so that switching between different solutions is possible. The solution pumped by the low pressure pump 108 is supplied to a T-joint 110. The T-joint 110 also receives the buffer solution from a container 112. The T-joint 110 is directly connected to the container 112 hence the buffer solution flows freely into the blending unit 110. In an embodiment a high pressure pump 114 may be configured to pump the buffer solution from the container 112 into the T-joint 110. In other ways the suction pressure created by the high pressure pump 114 may enable the buffer solution to flow from the container 112 into the T-joint 110. In other ways a difference between the pressure created by the low pressure pump 108 and the high pressure pump 114 creates the suction pressure for allowing the buffer solution to flow the container 112 into the T-joint 110. The pressure developed by the high pressure pump 114 can be varied based on requirement of the blended solution that needs to be prepared. In the T-joint 110 the solution and the buffer solution are blended or mixed to form a blended solution. The blended solution may be a buffer that is required for various purposes for instance for chromatography applications for purifying mixtures of proteins. However it may be envisioned that the buffer can be used for any other purposes as well. In an embodiment the T-joint 110 may be a magnetic stirrer that can blend the solution with the buffer solution. However it may be envisioned that the T-joint 110 may have any other structural and functional configuration or arrangement known in the art for performing the blending of the solutions.

For instance the container 112 may store water and the container 104 may store an acid. The low pressure pump 108 pumps at low pressure to supply the acid into the T-joint 110. The switch valve 106 opens to allow the acid to flow into the T-joint 110. The water present in the container 112 flows directly into the T-joint 110. In another instance the switch valve 106 may also switch its connection to allow the water to flow into the T-joint 110. Here the low pressure pump 108 can develop the pressure to pump the water into the T-joint 110. In an embodiment the T-joint may be a blending unit. The blending unit may blend the acid with water.

The blended solution pumped by the high pressure pump 114 is analyzed for determining its characteristics such as but not limited to pH, conductivity and so on. In an embodiment a sensor 116 and a sensor 118 may be present between the blending unit 110 and the high pressure pump 114. The sensor 116 may be a pH sensor to determine a pH level of the blended solution and the sensor 118 may be a conductivity sensor for determining the conductivity associated with the blended solution. In the event of any variation in the desired pH level and conductivity level associated with the blended solution, the flow rate of the solution through the low pressure pump 108 and the flow rate of the buffer solution from the container 112 to the T-joint 110 are also varied. The flow rate of the buffer solution may be controlled by varying the pressure developed by the high pressure pump 114. Further the flow rate of the solution present in the container 104 passing through the switch valve 106 can be varied by varying the pressure developed by the low pressure pump 108. As the sensors 116 and 118 are positioned at a low pressure side proximate to the low pressure pump 108 the operation or functioning of these sensors is not affected by any high pressure and thus monitoring the characteristics of the blended solution can be performed accurately. Even though only two sensors i.e. the sensor 116 and the sensor 118 are explained here and represented in FIG. 1 there can be more sensors arranged to determine or monitor various other parameters associated with the blended solution.

Figure 2A:
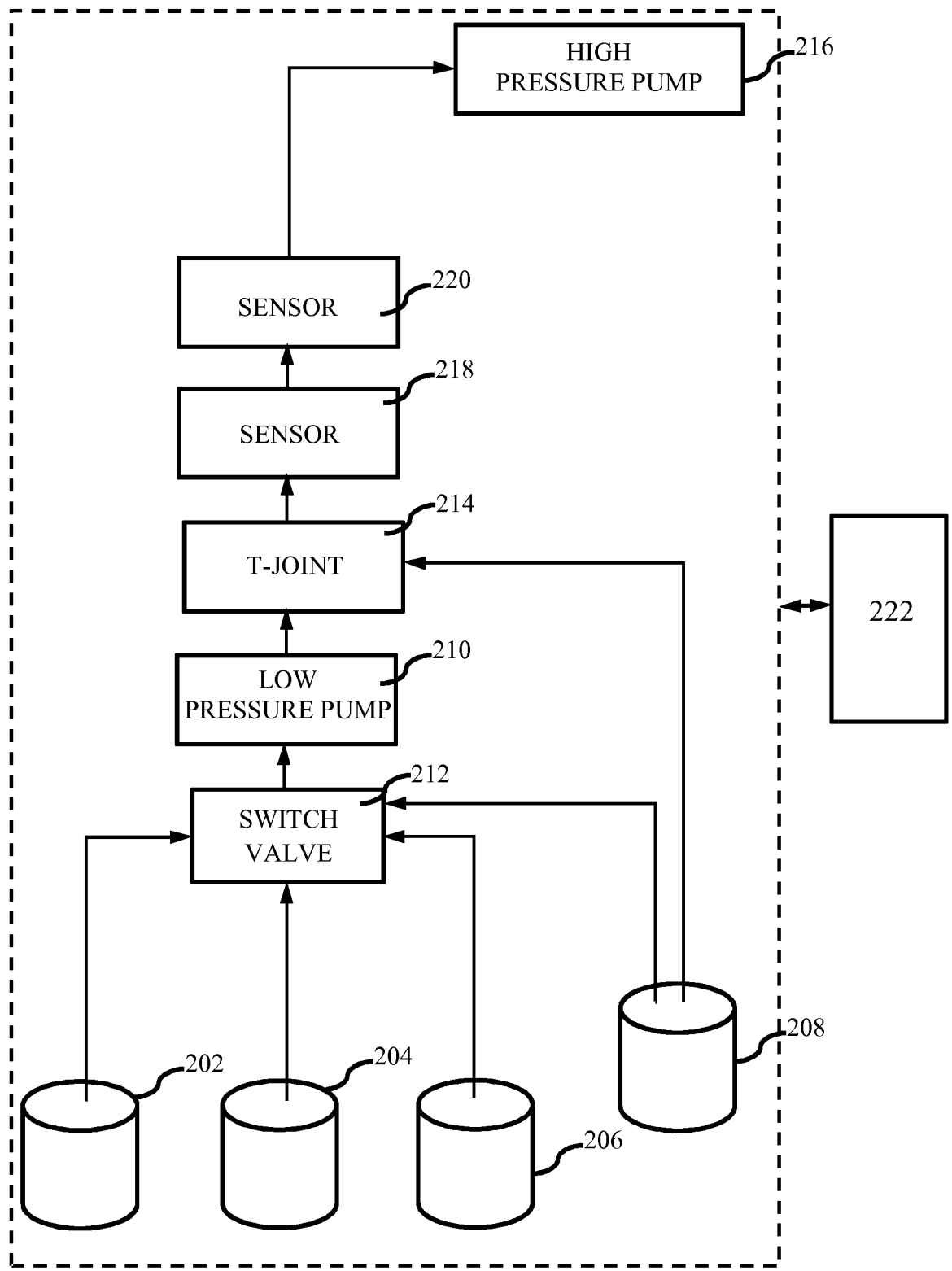
FIG. 2A is a schematic illustration of a system for preparing a buffer solution according to an exemplary embodiment.

FIG. 2A illustrates a system 200 for blending multiple solutions according to another embodiment. The system 200 includes multiple solutions for instance four solutions stored in four containers such as a container 202, a container 204, a container 206 and a container 208. In an embodiment the container 202, the container 204, the container 206 and the container 208 hold an acid, a base, a salt and water. The containers 202, 204, 206 and 208 are connected to a low pressure pump 210 through a switch valve 212. The low pressure pump 210 creates a low pressure which enables a solution to be pumped from one of the containers and allowed to pass through the switch valve 212. The switch valve 212 can switch between the containers to supply each solution into a T-joint 214. The flow rate of each solution through the switch valve 212 may vary based on the requirement. The flow rate can be varied based on an amount to which the switch valve 212 is opened. In another instance the pressure developed by the low pressure pump 210 varies to vary the flow rate of solutions thereby the amount of the solutions delivered varies.

The solution received in the T-joint 214 is mixed together to form a blended solution that is pumped by a high pressure pump 216. As the solutions and the buffer solution are mixed in the T-joint 214 at a low pressure side closer to the low pressure pump 210 they can be mixed well and determining the characteristics is more convenient. The high pressure pump 216 may create a pressure that is more than the low pressure pump 210. The blended solution is analyzed for determining its characteristics such as but not limited to pH, conductivity and so on. In an embodiment a sensor 218 and a sensor 220 may be present between the T-joint 214 and the high pressure pump 216. The sensor 218 may be a pH sensor to determine a pH level of the blended solution and the sensor 220 may be a conductivity sensor for determining the conductivity associated with the blended solution. In the event of any variation in the desired pH level and conductivity level associated with the blended solution, the flow rate of the solution through the low pressure pump 210 and the flow rate of the buffer solution from the container 208 to the T-joint 214 are also varied. The flow rate of the buffer solution through a direct connection between the container 208 and the T-joint 214 may be controlled by varying the pressure developed by the high pressure pump 216. Further the flow rate of one or more solutions present in any of the containers 202, 204 and 206, passing through the switch valve 212 can be varied by varying the pressure developed by the low pressure pump 210. As the sensors 218 and 220 are positioned at a low pressure side proximate to the low pressure pump 210 the operation or functioning of these sensors is not affected by any high pressure and thus monitoring the characteristics of the blended solution can be performed accurately. Even though only two sensors i.e. the sensor 218 and the sensor 220 are explained here and represented in FIG. 2 there can be more sensors arranged to determine or monitor various other parameters associated with the blended solution.

Figure 2B:
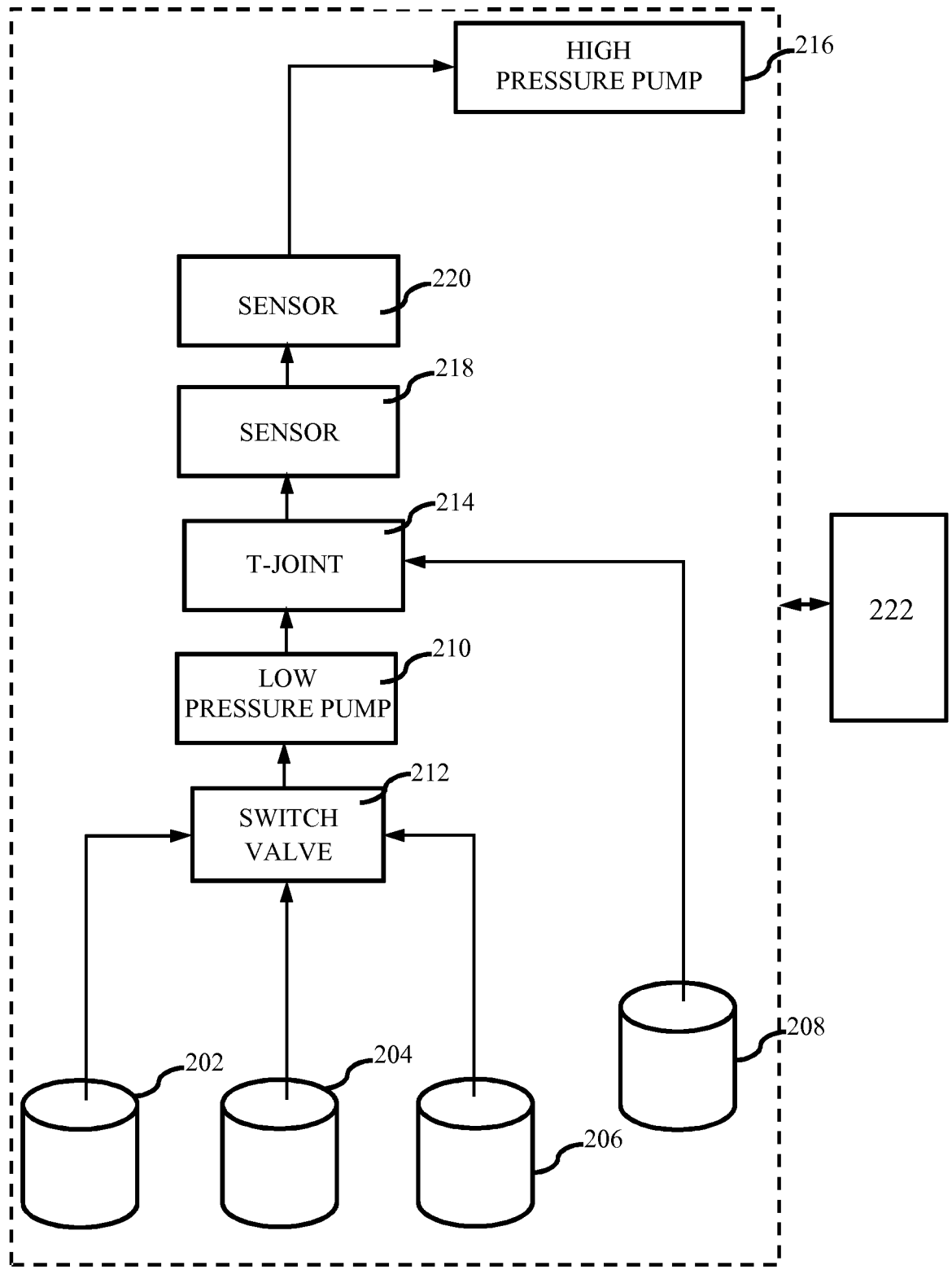
FIG. 2B is a schematic illustration of a system for preparing a buffer solution according to another exemplary embodiment.

Further FIG. 2B illustrates the system 200 for blending multiple solutions according to another exemplary embodiment. In this embodiment the container 202, the container 204, the container 206 and the container 208 hold an acid, a base, a salt and water. The containers 202, 204, and 206 are connected to the low pressure pump 210 through the switch valve 212. The container 208 is connected to the T-joint 214 directly. In an embodiment a check valve (not shown in FIG. 2B) may be provided connecting the T-joint 102 and the container 208. The check valve also avoids any mixing that may happen between a solution and the buffer solution in the container 208. In another embodiment there may be combination of valves and pumps arranged between the connection between the T-joint 102 and the container 208 for supplying the buffer solution. For instance two pumps may be present for pumping the buffer solution into the T-joint 102. Here one pump may not have a complete flow rate range of the system 100 but may have the complete pressure range of system 100. Further other pump may have the complete flow rate range of the system 100 but not the complete pressure range. The low pressure pump 210 creates a low pressure which enables a solution to be pumped from one of the containers and allowed to pass through the switch valve 212. The switch valve 212 can switch between the containers 202, 204, and 206 to supply each solution into a T-joint 214. The flow rate of each solution through the switch valve 212 may vary based on the requirement. The flow rate can be varied based on an amount to which the switch valve 212 is opened. The T-joint 214 may receive the solution from the container 208. In another instance the pressure developed by the low pressure pump 210 varies to vary the flow rate of solutions thereby the amount of the solutions delivered varies. The solutions received in the T-joint 214 is mixed together to form a blended solution that is pumped by a high pressure pump 216.

Considering an example of the setup in FIG. 2A the high pressure pump 216 and the low pressure pump 210 may have a flow rate capability of 100 ml/min and 20 ml/min respectively. If a blended solution having 2% acid, 4% base, 4% salt solution and 90% buffer solution (e.g. water) then the cycle time for opening the switch valve 212 may be 5 seconds. The buffer solution may be allowed to flow through the direction connection between the container 208 and the T-joint 214 and the flow rate here may be 80 ml/min. Then 80% of the required flow rate is through the direction connection. The switch valve 212 may open and close to connect with each of the containers 202, 204, 206 and 208 to deliver the solutions i.e. acid, base and salt solution and buffer solution respectively in them. The switch valve 212 may allow the base to flow at 20 ml/min for a period of 1 sec, thereafter the salt to flow at 20 ml/min for a period of 1 sec and acid to flow at 20 ml/min for a period of 0.5 sec and buffer solution to flow at 20 ml/min for a period of 2.5 sec. Thus due to the presence of low pressure pump and the direction connection between the container 208 and the T-joint 214 lower concentration of the acid, base and salt can be delivered to the blending unit for forming the blended solution. The blended solution may be used for inline conditioning in a chromatography system. The inline conditioning process is performed for formulation of buffer solutions along with purification in a chromatography application.

The operation and functioning of the switch valve 212, the low pressure pump 210, the sensors 218 and 220 and the high pressure pump 216 is controlled by a control system 222. The sensors 218 and 220 may provide feedback associated with the characteristics of the blended solution received from the T-joint 214 to the control system 222. Accordingly the control system 222 controls the functioning of the switch valve 212, the low pressure pump 210 and the high pressure pump 216 to vary its flow rate and the pressure developed for producing the blended solution. The characteristics of the blended solution such as a buffer solution used in chromatography needs to have desired buffering capacity for purification of any proteins otherwise can lead to lesser yields. The buffering capacity may be associated with multiple factors such as pKa values which correspond to pH value.

Figure 3:
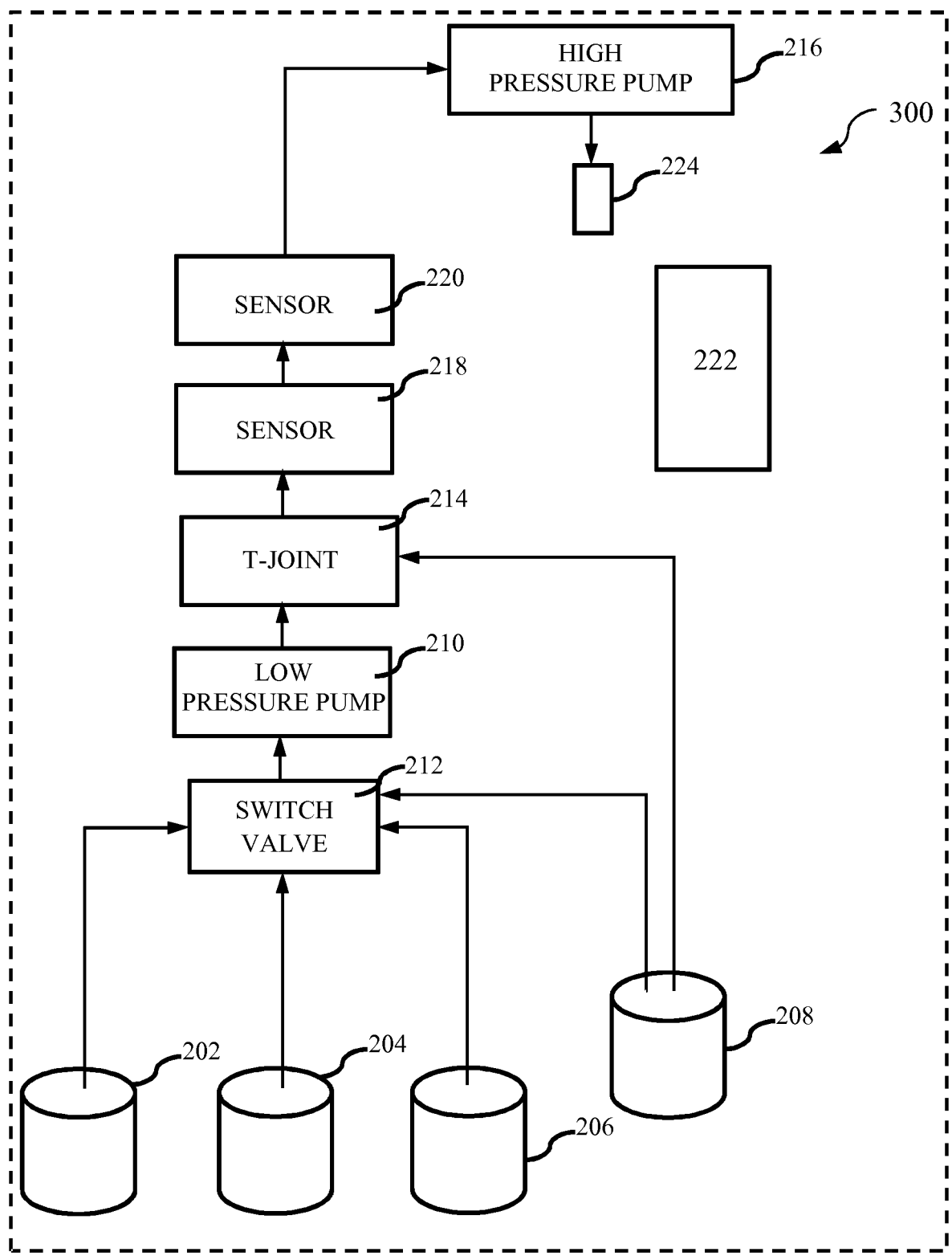
FIG. 3 is a schematic illustration of a chromatography system having the system for blending multiple solutions embodiment there within in accordance to an exemplary embodiment.

The blended solution as described before can be used for a chromatography application. The blended solution may be a buffer solution that is allowed to pass through a chromatography column. FIG. 3 illustrates a chromatography system 300 having the system 200 for blending multiple solutions embodiment there within in accordance to an exemplary embodiment. The blended solution received by the high pressure pump 216 may be delivered into a chromatography column 224. In the chromatography column 224 the blended solution may facilitate purification and separation of different substances for instance proteins. Based on the characteristics of the proteins and any purification or separation requirements different kinds of blended solution may be formed and supplied to the chromatography column. Thus the switch valve 212, the low pressure pump 210, the sensors 218 and 220 and the high pressure pump 216 can be embodied in the chromatography system 300 for supplying blended solutions of various concentration for purifying and separating different proteins. The chromatography system 300 may be capable of accommodating multiple containers such as the containers 202, 204, 206 and 208.

From the foregoing, it will be appreciated that the above system for blending of solutions is disclosed. In this system as low pressure pumps are used to collect and deliver solutions to a blending unit through a switch valve, sensors placed between the low pressure pumps and a high pressure pump can determine the characteristics of the buffer solution. As a low pressure pump is used to pump the solution from the containers the switch valve can accommodate to supply the solution at a low flow rate. The mixing of the solutions occurs in a blending unit at a low pressure side closer to the low pressure pump. The sensors are present near to the low pressure pump so they are not affected by high pressure and thus characteristics of the blended solution can be conveniently and accurately determined. Further due to a direction connection between the container holding the buffer solution and the blending unit a major portion of the required buffer solution can be supplied through this connection and hence more time of the switch valve cycle time will be available for other solutions to be delivered through the switch valve and the low pressure pump. As the buffer solution is the major percentage of the blended solution formed and supplied through this direct connection a low pressure pump can be used to pump the other solutions into the blending unit. Due to the presence of the low pressure pump any desired flow rate of the solution through the switch valve can be accommodated. Moreover the low pressure pump enables the blending of solutions to occur at a low pressure environment.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A system for blending solutions, the system comprising:
    a first container holding at least one solution;
    a second container holding a buffer solution;
    a switch valve capable of flowing the at least one solution, wherein the switch valve is fluidically connected to the first container and to the second container;
    a low pressure pump fluidically connected to the switch valve for pumping, the at least one solution through the switch valve;
    a high pressure pump for collecting a blended solution comprising the at least one solution and the buffer solution;
    a T-joint placed between and fluidically connected to the low pressure pump and the high pressure pump, the T-joint being fluidically coupled to the first container through the low pressure pump to receive the at least one solution through the low pressure pump, wherein the T-joint is fluidically connected to the second container holding the buffer solution through at least one direct connection to blend the at least one solution with the buffer solution to form the blended solution,
    wherein the switch valve is configured to allow the buffer solution to flow from the second container through the low pressure pump, and
    wherein the low pressure pump is configured to, pump the buffer solution from the second container through the switch valve to the T-joint.

2. The system of claim 1, wherein the at least one solution comprises at least one of an acid, a base and a salt solution.

3. The system of claim 1, further comprising a control system configured to: control operation of the low pressure pump for supplying the at least one solution and control the functioning of the switch valve capable of flowing the at least one solution.

4. The system of claim 3, wherein the control system is configured to control the flow rate of the at least one solution supplied by the at least one low pressure pump, the flow rate of the at least one solution determines concentration of the blended solution.

5. The system of claim 1, further comprising at least one sensor configured to measure characteristics of the blended solution received at the high pressure pump.

6. The system of claim 5, wherein a sensor of the at least one sensor is configured to measure a conductivity associated with the blended solution.

7. The system of claim 5, wherein a sensor of the at least one sensor is configured to measure a pH level associated with the buffer solution.

8. The system of claim 1, further comprising a sensor between and fluidically connected to the low pressure pump and the high pressure pump.

9. A chromatography system comprising:
    a first container holding at least one solution;
    a second container holding a buffer solution;
    a switch valve capable of flowing at least one solution, wherein the switch valve is fluidically connected to the first container and to the second container;
    a low pressure pump fluidically connected to the switch valve for pumping the at least one solution through the switch valve;
    a high pressure pump for collecting and delivering a blended solution comprising the at least one solution and the buffer solution to a chromatography column;
    a T-joint placed between and fluidically connected to the low pressure pump and the high pressure pump, the T-joint capable of receiving the at least one solution through the low pressure pump, wherein the T-joint is fluidically connected to the container holding the buffer solution through at least one direct connection to blend the at least one solution with the buffer solution to form the blended solution, and
    wherein the switch valve is configured to allow the buffer solution to flow from the second container through the low pressure pump, and
    wherein the low pressure pump is configured to pump the buffer solution from the second container through the switch valve to the T-joint.

10. The chromatography system of claim 9, wherein the at least one solution comprises at least one of an acid, a base and a salt solution.

11. The chromatography system of claim 9, further comprising a control system configured to: control operation of the low pressure pump for supplying the at least one solution and control the functioning of the switch valve capable of flowing the at least one solution.

12. The chromatography system of claim 11, wherein the control the flow rate of the at least one solution supplied by the at least one low pressure pump, the flow rate of the at least one solution determines concentration of the blended solution.

13. The chromatography system of claim 9, further comprising at least one sensor configured to measure characteristics of the blended solution received at the high pressure pump.

14. The chromatography system of claim 13, wherein a sensor of the at least one sensor is configured to measure a conductivity associated with the blended solution.

15. The chromatography system of claim 13, wherein a sensor of the at least one sensor is configured to measure a pH level associated with the blended solution.

16. The system of claim 9, further comprising a sensor between and connected to the low pressure pump and the high pressure pump.

* * * * *